J. BABIS, Jr.
SHOCK ABSORBING DEVICE FOR MOTOR CYCLES.
APPLICATION FILED OCT. 13, 1914.

1,168,702.

Patented Jan. 18, 1916.

WITNESSES
Elsie Fullerton
Hamilton S. Turner

INVENTOR
JOHN BABIS, JR.
BY HIS ATTORNEY
Harry Smith

UNITED STATES PATENT OFFICE.

JOHN BABIS, JR., OF PHILADELPHIA, PENNSYLVANIA.

SHOCK-ABSORBING DEVICE FOR MOTOR-CYCLES.

1,168,702. Specification of Letters Patent. Patented Jan. 18, 1916.

Application filed October 13, 1914. Serial No. 866,433.

*To all whom it may concern:*

Be it known that I, JOHN BABIS, Jr., a citizen of the United States, residing in Philadelphia, Pennsylvania, have invented certain Improvements in Shock-Absorbing Devices for Motor-Cycles, of which the following is a specification.

The object of my invention is to provide the frame of a motor cycle with an effective form of shock absorbing device which will serve to lessen the force of the shock upon the springs which usually constitute the sole means for this purpose. This object I attain in the manner hereinafter set forth, reference being had to the accompanying drawing, in which—

Figure 1:
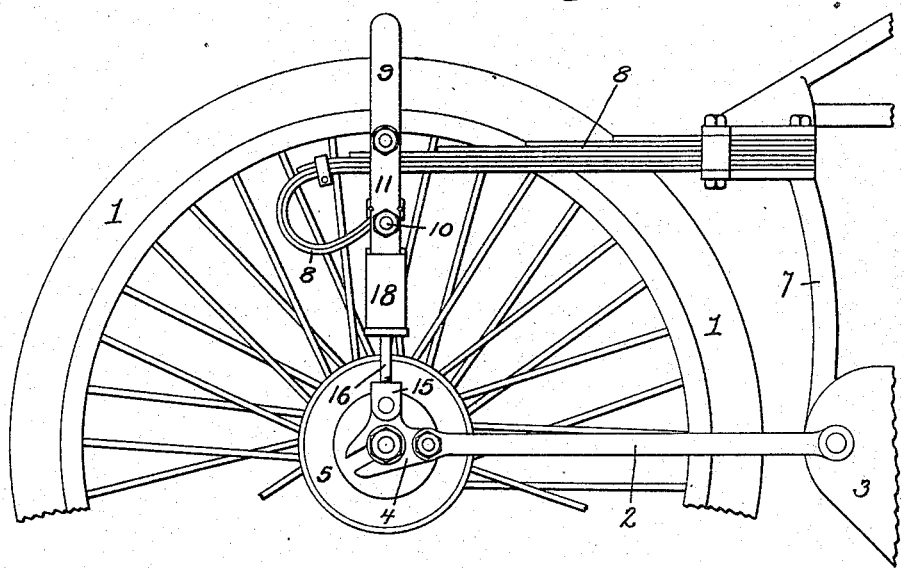
Figure 2:
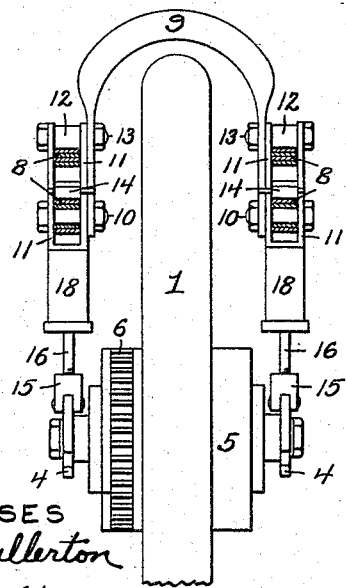
Figure 3:
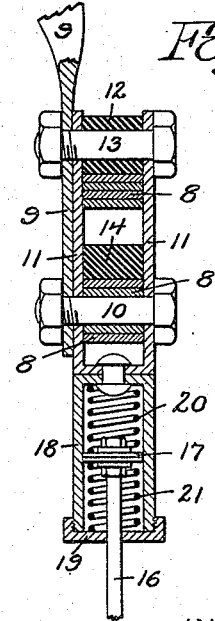

Figure 1 is a side elevation of a portion of the rear wheel and rear frame of a motor cycle showing the position of my improved shock absorber in respect to the rear frame and the usual shock absorbing spring; Fig. 2 is a rear elevation of the same, partly in section, and Fig. 3 is an enlarged sectional view of one of the side members of the rear fork illustrating the application of my improved shock absorber thereto.

In Fig. 1 of the drawing, 1 represents part of the rear wheel of a motor cycle and 2 a longitudinal strut such as is employed at each side of the rear wheel and extending from the gear case 3 to a plate 4, to which the end of the rear axle is secured, 5 representing the hub of the rear wheel which has at one side a sprocket wheel 6 for receiving the driving chain which I have not considered it necessary to illustrate in the drawing, as it forms no essential part of my invention.

Extending rearwardly from the mid frame 7 of the motor cycle is a leaf spring 8 which extends rearwardly beyond the rear fork 9 of the frame and is then curved forwardly for connection with a bolt 10 passing through a U-shaped member 11, one of which is secured to each side of the rear fork 9 so that upward thrust upon said U-shaped member 11 is exerted upon the forwardly bent end of the spring 8 and is thus caused to be transmitted through said spring 8 to the mid frame 7 upon which the saddle is mounted. The upper portion of each spring bears upon a rubber tube 12 surrounding a transverse bolt 13 at the top of the U-shaped member, and a rubber buffer 14 is interposed between said upper portion of the spring and the forwardly bent rear end of the same.

Secured to each of the axle supporting plates 4 is the forked lower end 15 of a rod 16 and when the upper end of this rod is, as usual, secured directly to the lower end of the U-shaped member 11 of the rear fork of the frame so that shocks are imparted directly to the latter and thence to the forwardly bent rear end of the spring fracture of the bent portion of the same frequently results. In order to overcome this objection I disconnect the rod 16 from the U-shaped member 11 and provide said rod 16 at its upper end with a piston 17 free to move up and down in a cylinder 18, whose upper end is secured to the lower end of the U-shaped member 11 and whose lower end is provided with a removable cap 19 having a central opening for the passage of the rod 16, as shown in Fig. 3.

Between the piston 17 and the top of the cylinder 18 is interposed a coiled spring 20 and between said piston 17 and the cap 19 is interposed a similar coiled spring 21. Because of this construction shocks or jars imparted to the axle of the rear wheel are transmitted to the U-shaped members of the rear fork through the medium of the springs 20 and the first force of the shock is absorbed by said springs before it reaches the U-shaped member or the forwardly bent rear end of the spring 8, the consequence being that by the time the shock reaches the end of the spring it will have been eased to such an extent as to prevent any likelihood of fracture of the spring thereby. In like manner sudden downward movements of the piston 17 are checked by the lower spring 21 and easy riding is thereby insured.

My invention may also, if desired, be used in connection with the shock absorbing spring usually employed in connection with that portion of the frame which carries the front wheel.

I claim:

1. The combination of the axle of a motor cycle wheel, a leaf spring having a free end, and a member inserted between the axle and said free end of the leaf spring, said member having as elements a rod moving with the axle, means for guiding said rod, a spring interposing an elastic resistance to upward movements of the rod, and means whereby upward thrust of said spring is transmitted to the free end of the leaf spring.

2. The combination of the axle of a motor cycle wheel, a backwardly extending leaf spring having a forwardly projecting free end, and a shock absorbing member having as elements a stop for contacting with the back of the rearwardly extending main portion of the leaf spring, a rod moving with the axle, means for guiding said rod, a spring interposing a yielding resistance to upward movements of said rod, and means whereby upward thrust of said spring is transmitted to the free end of the leaf spring.

3. The combination of the axle of a motor cycle wheel, a leaf spring having a free end, and a member inserted between the axle and said free end of the leaf spring, said member having as elements a rod moving with the axle, means for guiding said rod, upper and lower springs, the former interposing an elastic resistance to upward movements of the rod and the lower spring interposing elastic resistance to downward movements of said rod, and means whereby the upward thrust of the upper spring and the downward thrust of the lower spring are transmitted to the free end of the leaf spring.

In testimony whereof, I have signed my name to this specification, in the presence of two subscribing witnesses.

JOHN BABIS, Jr.

Witnesses:
KATE A. BEADLE,
HAMILTON D. TURNER.

Copies of this patent may be obtained for five cents each, by addressing the "Commissioner of Patents, Washington, D. C."